March 5, 1940.  L. F. NENNINGER  2,192,856
SPINDLE CONSTRUCTION
Filed Jan. 31, 1938
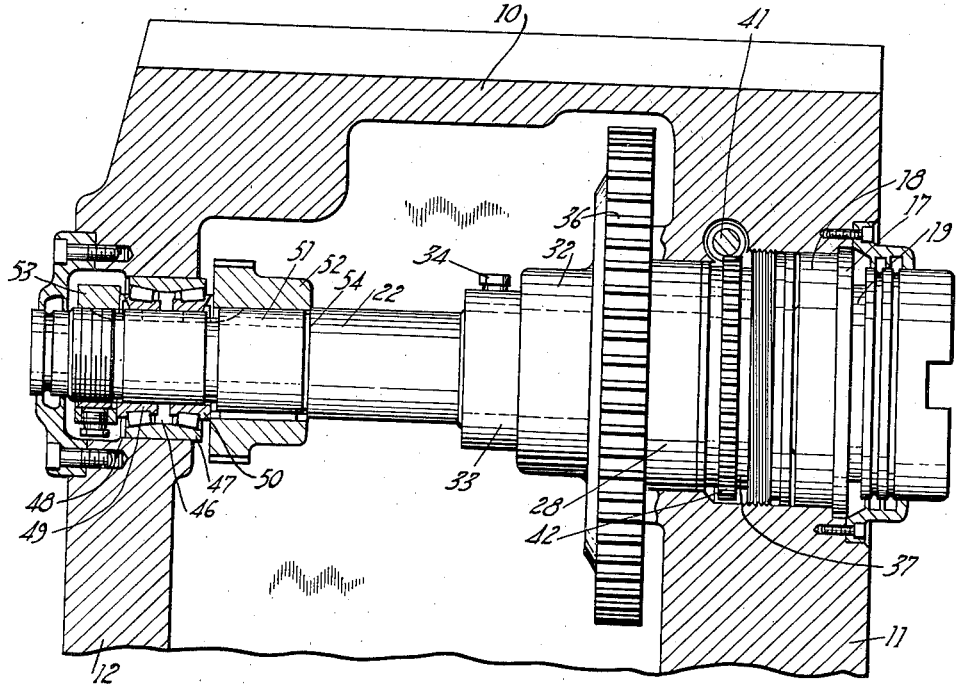
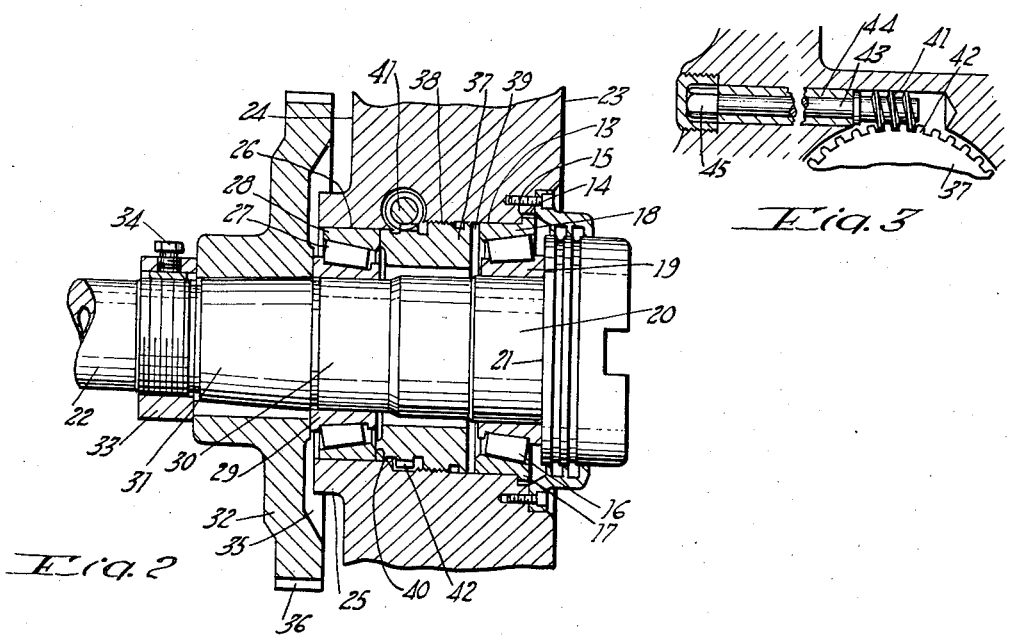
INVENTOR.
LESTER F. NENNINGER
BY
A. H. Parsons
ATTORNEY.

Patented Mar. 5, 1940

2,192,856

UNITED STATES PATENT OFFICE 2,192,856

SPINDLE CONSTRUCTION

Lester F. Nenninger, Cincinnati, Ohio, assignor to The Cincinnati Milling Machine Company, Cincinnati, Ohio, a corporation of Ohio Application January 31, 1938, Serial No. 187,804

7 Claims. (Cl. 90—11)

This invention relates to machine tools and more particularly to an improved spindle mounting assembly.

One of the objects of this invention is to improve the manner of supporting the spindle of a milling machine so as to obtain better stress conditions and thereby greater rigidity during power rotation thereof.

Another object of this invention is to provide an improved bearing structure for a milling machine spindle whereby maximum spread between the pair of antifriction bearings which support the nose of the spindle may be obtained for a given thickness of supporting wall.

A further object of this invention is to improve the spindle assembly of a milling machine whereby the driving members attached to the spindle may be brought into closer proximity to the supporting bearings and thereby minimize the bending stresses on the spindle during power actuation thereof.

Other objects and advantages of the present invention should be readily apparent by reference to the following specification considered in conjunction with the accompanying drawing illustrative of one embodiment thereof, but it will be understood that any modifications may be made in the specific structural details within the scope of the appended claims without departing from or exceeding the spirit of the invention.

Referring to the drawing in which like reference numerals indicate like or similar parts:

Figure 1 is a sectional view through the column of a conventional knee and column type milling machine showing the spindle assembly mounted therein.

Figure 2 is a section through the bearing in the front wall showing the means for preloading the bearing.

Figure 3 is a detail section on the line 3—3 of Figure 1, showing the operating means for adjusting the preload on the bearings.

It is a desideratum with respect to milling machine spindles that the driving torque be transmitted to the spindle with the least possible bending strain thereon, so that the axial alignment of the cutter will not be disturbed especially under heavy cuts. This invention deals with a mechanism for obtaining these desired results by so arranging the parts that the disturbing lateral forces are more directly absorbed by the column rather than being transmitted thereto through the spindle.

It is also desirable, where antifriction bearings are used in pairs, to preload the bearings so as to prevent axial play in the spindle. In prior structure, this has been done in a manner which limited the spread or spacing between the bearings, and thereby limited the rigidity which would otherwise be obtainable if the bearings had a greater spacing. In addition, the conventional manner of obtaining the preload required that one of the inner races be movable axially relative to the spindle thereby preventing a tight fit between the two. The result under heavy loads was a certain amount of relative circumferential creepage between the inner race and the spindle which caused crystallization of the metal and increased wear. This aggravated the condition and caused increased looseness of the fit between the inner race and the spindle. In the present construction these deleterious results have been obviated by contriving a preloading mechanism which does not require relative movement between the inner races of either bearing, and the spindle.

Referring to Figure 1 of the drawing, the reference numeral 10 indicates generally the column of a milling machine having a front wall 11 and a rear wall 12. The front wall 11 has a bore 13 formed therein which is counterbored at 14 to form a shoulder 15. A tapered roller anti-friction bearing, indicated generally by the reference numeral 16, is mounted in the bore with the annular rib 17, formed on the end thereof, in engagement with the shoulder 15 to predetermine the position of the bearing. The bearing has an outer race member 18, upon which the annular flange is formed, and an inner race member 19 which has a tight fit on the journal portion 20 with one end engaging the shoulder 21 of the nose of the spindle 22. It will be noted that the shoulder 21 is in substantial alignment with the front face 23 of the wall 11.

The rear face 24 of the wall 11 has a boss 25 projecting therefrom in which is formed a second bore 26 for receiving a second tapered roller antifriction bearing, indicated generally by the reference numeral 27. This bearing has an outer race member 28 and an inner race member 29 which is fixed on the journal portion 30 of the spindle for rotation therewith. The spindle 22 has a tapered portion 31 upon which is keyed a drive gear 32. The hub of the drive gear engages the end of the inner race 29 of the bearing 27. In order to insure that the drive gear is held in position on the tapered portion 31, a locking nut 33 is threaded on the spindle into tight engagement with the end of the gear and held in position by a set screw 34. It will be noted that the drive gear has a depressed face 35 next to the boss 25 whereby a portion of the teeth 36 of the gear lie beyond the plane of the face of the boss.

In order to prevent axial movement or oscillation of the spindle, it is desirable that all looseness in the antifriction bearings be taken up, and therefore means have been provided for preloading the bearings. This is accomplished by providing a preloading member 37, which is threaded at 38 in a bore 39. This bore interconnects the front and rear bores containing the antifriction bearings. The preloading member is mounted within the wall of the column and located between the antifriction bearings.

The preloading member has an annular face 40 which engages the end face of the outer race member 28 of the antifriction bearing 27. By rotating the member 37 in one direction or the other, it will be advanced or retracted with respect to the race member 28. By rotating it in a direction to cause advance, endwise pressure can be applied on the race member 28 toward the left as viewed in Figure 2, which will be transmitted through the tapered rollers, the inner race member 29, the drive gear 32, and the locking nut 33 to the spindle, which in turn will transmit the pressure through the inner race member 19 of the bearing 16 by virtue of its contact with shoulder 21 of the spindle, to the outer race member 18 through the antifriction rollers, and then through the shoulder 15 to the column. It will thus be apparent that the inner race members of the antifriction bearings may now be tightly fitted to the spindle.

When the preloading member 37 is rotated, it will move the outer race member 28 relative to the wall of the bore 26 to effect preloading of the bearing. This rotation is effected by a spiral worm 41 which interengages with spiral gear teeth 42 formed on the periphery of the member 37. The spiral worm 41 is attached to the end of a shaft 43 which, as shown in Figure 3, is bearinged in a sleeve 44 and is provided with a hexagon head 45 to which a suitably formed socket wrench may be applied.

By means of this improved construction, it will be apparent that the application of a large driving force on the gear 36 will not cause deflection of the spindle 22 to any great degree, and furthermore that the antifriction bearings are spaced as wide as the thickness of the column will permit, thereby affording better resistance to lateral deflection of the spindle; and that the inner race members of the antifriction bearings may be tightly fitted to the spindle because no relative axial movement between them and the spindle is necessary for preloading purposes.

The other end of spindle 22 is supported in the rear wall 12 of the column on an antifriction bearing indicated generally by the reference numeral 46. The outside race member 47 of this bearing is fitted to slide in a bore 48 formed in the rear wall concentric to the bores in the front wall so that it may move to compensate for expansion and contraction of the spindle. The inner races 49 and 50 are splined on the reduced portion 51 of the spindle, between a gear 52 which is keyed to the spindle, and a clamping member 53 which is threaded on the spindle. The drive gear 52 fits against a shoulder 54 formed on the spindle and the clamping member 53 is tightened to clamp the inner races and the gear against the shoulder 54. By means of this construction the gear 52 may be mounted on the spindle very close to the rear wall so that lateral forces developed in the gear during driving will be transmitted almost directly to the wall without causing deflection of the spindle. Also, by splining the inner races on the spindle, circumferential creepage is prevented.

There has thus been provided an improved spindle bearing structure for a milling machine which permits of maximum spacing of the antifriction bearings in the front wall of the column, thereby increasing the rigidity of the spindle and at the same time permitting the drive gears to be placed in close proximity to the faces of the walls thereby reducing to a minimum any lateral bending of the spindle during rotation under heavy cuts, whereby more accurate work may be produced.

What is claimed is:

1. In a milling machine having a column composed of front and rear walls, the combination of means for supporting a spindle in the column including a pair of antifriction bearings fixed on the spindle and mounted in the front wall, the inner race of one of said bearings engaging a shoulder on said spindle, and the outer race engaging a fixed reference surface on said column for locating the spindle endwise, abutment means carried by the spindle and engaging the inner race of the other bearing, and means interposed between said bearings within the wall of the column for exerting a pressure on the outer race of the last named bearing which is transmitted through said abutment means and spindle to the inner race of the first bearing for preloading said bearings, and simultaneously locating the axial position of the spindle with respect to the front wall of the column by means of said reference surface.

2. In a knee and column type milling machine, the combination of means for supporting a spindle in the opposing walls of the column, including a first pair of antifriction bearings mounted in one wall, a second pair of antifriction bearings mounted in the other wall, drive gears mounted on the spindle adjacent the respective opposing walls, means holding said gears in abutting relation with the inner races of adjacent bearings, means to fix the position of the bearings in one wall and thereby hold that end of the spindle against axial movement, and means to support the bearings in the other wall for movement relative to the column to compensate for expansion and contraction of the spindle.

3. In a milling machine of the knee and column type and including front and rear structural walls, said walls having axially aligned bores therein, the combination of a spindle, means mounted in said bores for supporting the spindle for rotation, including a pair of antifriction bearing members mounted in the front wall, the first of said bearings having means engaging the column and the spindle for determining the axial position thereof, a drive gear fixed with the spindle in adjacent relation to the inner face of the wall, means for holding said second bearing in pressure contact with said gear to thereby effect preloading of the bearings, additional antifriction bearing means mounted in the bore in the rear wall, a gear attached to the spindle adjacent the inner face of the rear wall, and means to clamp the last named bearing means in pressural engagement with said drive gear to effect preloading of the bearing.

4. In a milling machine having a column including front and rear walls in which are formed axially aligned bores, the combination of a cutter spindle having a shoulder formed at one end, an anti-friction bearing mounted on the spindle with its inner race abutting said shoulder and its outer race engaging the column whereby axial thrust on the spindle in one direction will be transmitted directly to the column, a second anti-friction bearing, a drive gear, and a threaded collar mounted on said spindle in the order named and in spaced relation to the first-named bearing, said second bearing projecting into the bore of the front wall, means within said bore having operative engagement with said column and the outer race of said second bearing for imparting a thrust through said second bearing, gear, collar and spindle to effect a preloading of said bearings and additional anti-friction bearings mounted in the bore of the rear column for supporting the other end of the spindle.

5. In a milling machine, a column having front and rear walls in which are formed axially aligned bores, a cutter spindle having mounted thereon a first and second series of elements, each series including an anti-friction bearing, a gear and a collar in abutting relation, said bearings projecting into the respective bores of the front and rear walls whereby the gears are positioned closely adjacent the faces of said walls, an additional anti-friction bearing mounted on the spindle in interposed relation between a shoulder on said spindle and a shoulder in the front end of the bore in the front wall, and means within the bore of the front wall for exerting a preloading pressure on the bearing in said bore and thereby fixing the axial position of said spindle.

6. In a milling machine, a column having front and rear walls in which are formed axially aligned bores, a cutter spindle having mounted thereon a first and second series of elements, each series including an anti-friction bearing, a gear and a collar in abutting relation, said bearings projecting into the respective bores of the front and rear walls whereby the gears are positioned closely adjacent the faces of said walls, an additional anti-friction bearing mounted on the spindle in interposed relation between a shoulder on said spindle and a shoulder in the front end of the bore in the front wall, and means within the bore of the front wall for exerting a preloading pressure on the bearing in said bore and thereby fixing the axial position of said spindle, said means including a collar having a threaded relation with said column, gear teeth formed on the periphery of said collar and a rotatable worm journaled in said column in intermeshing relation with said teeth for imparting rotation to the collar.

7. In a milling machine having a column composed of front and rear walls, the combination of means for supporting a spindle in the column including a pair of anti-friction bearings fixed on the spindle and mounted in the front wall, the inner race of one of said bearings engaging a shoulder on said spindle and the outer race engaging a fixed reference surface on said column for determining the axial position of the spindle, means interposed between the bearings and within the wall of the column for exerting a preloading pressure on the outer race of the other bearing, and abutment means carried by the spindle and engaging the inner race of said other bearing whereby the preloading pressure will be transmitted to the spindle through said abutment means so that said last-named inner race may be fixed on the spindle without provision for relative movement under the preloading pressure.

LESTER F. NENNINGER.